(12) United States Patent
Tsurusaki

(10) Patent No.: US 9,007,320 B2
(45) Date of Patent: *Apr. 14, 2015

(54) ELECTRONIC EQUIPMENT AND MOBILE TERMINAL PROVIDED WITH SAME

(75) Inventor: Kouji Tsurusaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 132 days.

This patent is subject to a terminal disclaimer.

(21) Appl. No.: 13/813,358

(22) PCT Filed: Oct. 26, 2011

(86) PCT No.: PCT/JP2011/074690
§ 371 (c)(1),
(2), (4) Date: Feb. 14, 2013

(87) PCT Pub. No.: WO2012/057214
PCT Pub. Date: May 3, 2012

(65) Prior Publication Data
US 2013/0135242 A1 May 30, 2013

(30) Foreign Application Priority Data

Oct. 27, 2010 (JP) ................................ 2010-240986

(51) Int. Cl.
*G06F 3/041* (2006.01)
*G06F 1/16* (2006.01)
*G06F 3/01* (2006.01)

(52) U.S. Cl.
CPC .............. *G06F 3/041* (2013.01); *G06F 1/1626* (2013.01); *G06F 3/016* (2013.01)

(58) Field of Classification Search
CPC .......... G06F 3/041–3/047; G06F 2203/04103; G06F 3/016; G06F 1/1626
USPC .......... 345/173–178; 178/18.01–18.09, 18.11
See application file for complete search history.

(56) References Cited

U.S. PATENT DOCUMENTS 8,593,420 B1 * 11/2013 Buuck ........................... 345/173
(Continued)

FOREIGN PATENT DOCUMENTS

| CN | 1821935 A | 8/2006 |
| CN | 101763166 A1 | 6/2010 |
| JP | 2004118754 A | 4/2004 |
| JP | 2010152888 A | 7/2010 |
| WO | 2010073509 A1 | 7/2010 |

OTHER PUBLICATIONS

Office Action, European Patent Application No. 11836347.2, issued Jan. 5, 2015.
(Continued)

Primary Examiner — Stephen Sherman
(74) Attorney, Agent, or Firm — Volpe and Koenig, P.C.

(57) ABSTRACT

The present invention is provided with: a touch panel for detecting the positions of inputs; a vibrating body provided to the touch panel; a first chassis having a base, positioned facing the touch panel across a space, and a frame body, positioned on the base so as to surround the touch panel in plan view; an operating unit, positioned on the front-surface-side of the touch panel so as to cover the touch panel in plan view; and a flexible part that is provided along the whole circumference of the frame body and supports the operating unit.

10 Claims, 10 Drawing Sheets

(56) References Cited

U.S. PATENT DOCUMENTS

2004/0061688 A1    4/2004   Nakayama et al.
2010/0156844 A1*   6/2010   Paleczny et al. .............. 345/174
2010/0253485 A1   10/2010   Park et al.
2011/0304569 A1   12/2011   Kai et al.

OTHER PUBLICATIONS

Office Action, Chinese Patent Application No. 201180035332.8, issued Feb. 2, 2015.

* cited by examiner

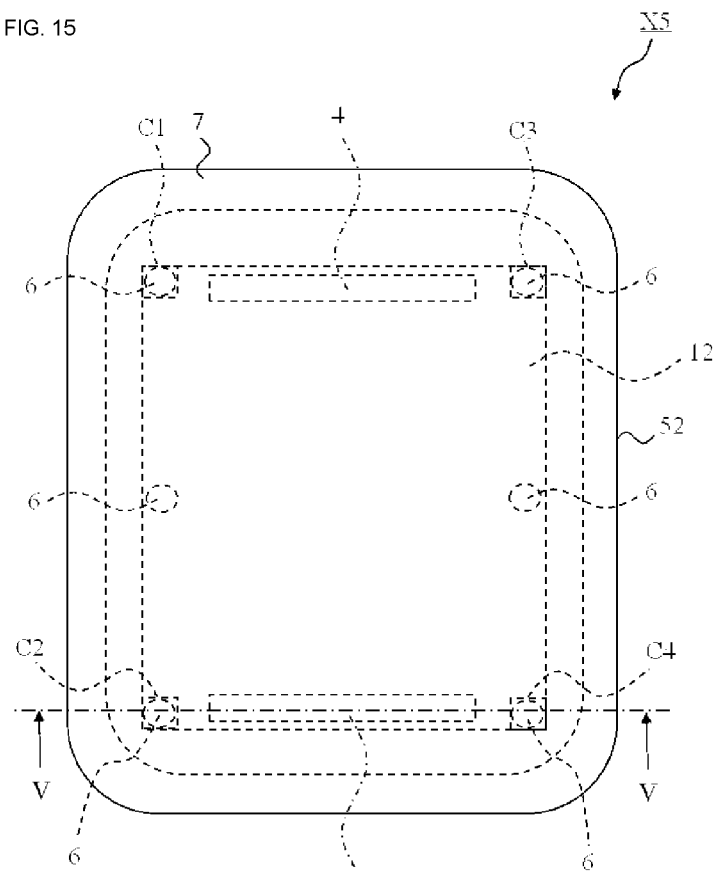

ELECTRONIC EQUIPMENT AND MOBILE TERMINAL PROVIDED WITH SAME

CROSS-REFERENCE TO RELATED APPLICATIONS

This application is national stage application of International Application No. PCT/JP2011/074690, filed on Oct. 26, 2011, which designates the United States, incorporated herein by reference, and which claims the benefit of priority from Japanese Patent Application No. 2010-240986, filed on Oct. 27, 2010, the entire contents of which are incorporated herein by reference.

TECHNICAL FIELD

The present invention relates to an electronic equipment and a mobile terminal including the same.

BACKGROUND ART

In recent years, there is a known tactile transmission technique to transmit various tactile senses, such as a sense of pressing, a sense of tracing, or a sense of texture, to a user when the user operates a touch panel (for example, see Patent Literature 1).

An electronic equipment to which such a tactile transmission technique is applied includes a vibrating body provided on a touch panel. The electronic equipment can transmit various tactile senses to the user by causing flexural vibration of the touch panel in the vertical direction according to expansion and contraction motions of the vibrating body. The electronic equipment to which such a tactile transmission technique is applied is mainly provided in a mobile terminal; therefore, dust-proofing and water-proofing are necessary.

Patent Literature 1: Japanese Patent Application Laid-open No. 2004-118754

SUMMARY OF INVENTION

The present invention relates to an electronic equipment capable of adequately transmitting tactile senses to a user while ensuring certain dustproof performance and waterproof performance, and a mobile terminal including the same.

An electronic equipment according to one aspect of the present invention comprises: a detecting unit that detects an input position; a vibrating body provided on the detecting unit; a first housing including a base disposed opposite the detecting unit with a space interposed therebetween and a frame body positioned on the base so as to surround the detecting unit in plan view; an operation unit positioned at a front surface side of the detecting unit so as to cover the detecting unit in plan view; and a flexible portion provided over a whole circumference of the frame body and supporting the operation unit.

A portable terminal according to another aspect of the present invention comprises the electronic equipment according to the present invention in a second housing.

BRIEF DESCRIPTION OF DRAWINGS

FIG. 14 is an enlarged view of a supporting body;

FIG. 15 is a plan view illustrating an overall configuration of an electronic equipment according to a fifth embodiment of the present invention;

MODES FOR CARRYING OUT INVENTION

Figure 1:
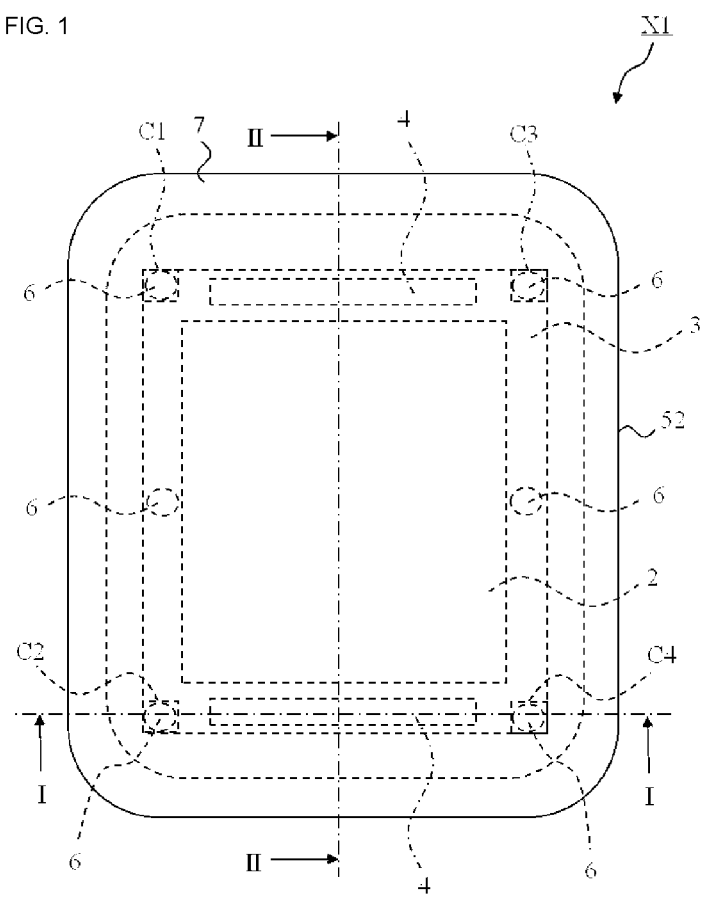
FIG. 1 is a plan view illustrating an overall configuration of an electronic equipment according to a first embodiment of the present invention.

Hereinafter, embodiments of the present invention will be described with reference to the drawings. Note that in the drawings to be referred to hereinafter, primary members necessary to describe the present invention, among components according to an embodiment of the present invention, are illustrated in a simplified manner, for convenience of explanation. Accordingly, an electronic equipment according to the present invention and a mobile terminal including the same may include other components that are not illustrated in the drawings to be referred to herein.

First Embodiment

As illustrated in FIG. 1 to FIG. 4, an electronic equipment X1 according to a first embodiment includes a liquid crystal panel 2, a touch panel 3, a vibrating body 4, a first housing 5, a supporting body 6, an operation unit 7, and a flexible portion 8.

The liquid crystal panel 2 is a display panel using a liquid crystal composition for display. Specifically, the liquid crystal panel 2 includes one substrate; the other substrate disposed opposite the one substrate; a liquid crystal layer interposed between the one substrate and the other substrate; a display member layer that is interposed between the one substrate and the other substrate and that contributes to displaying; and a backlight that irradiates the one substrate and the other substrate with light. Herein, for convenience of explanation, illustration of the one substrate, the other substrate, the liquid crystal layer, the display member layer, and the backlight is omitted. Examples of the display member layer include a pixel electrode, an alignment film, and a color filter. As a drive system of the liquid crystal panel 2, a simple matrix drive system or an active matrix drive system may be employed.

A display panel, such as a plasma panel, an organic EL panel, or electronic paper, may be used instead of the liquid crystal panel 2. The organic EL panel is a display panel incorporating a substance that emits light upon application of a voltage. Specifically, the organic EL panel is formed by depositing a luminous body using an organic substance, such as diamine, onto a substrate and performs display upon application of a direct-current (DC) voltage of 5V to 10V. In the case of using the organic EL panel instead of the liquid crystal panel 2, the backlight is not needed.

Figure 2:
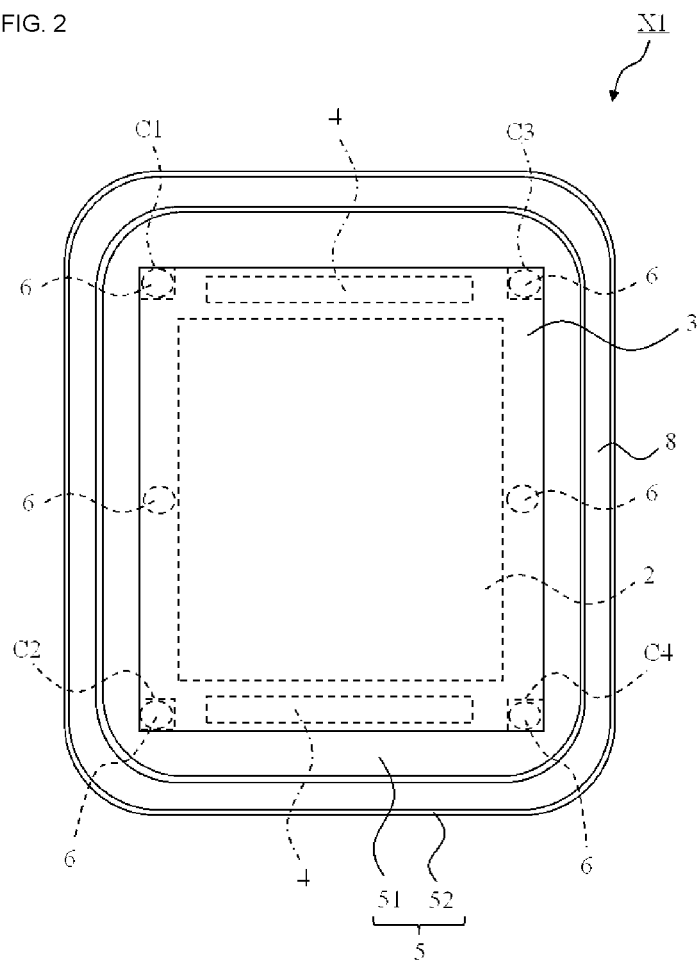
FIG. 2 is a plan view illustrating an overall configuration of the electronic equipment illustrated in FIG. 1, when the electronic equipment is viewed from above while an operation unit is omitted.
Figure 3:
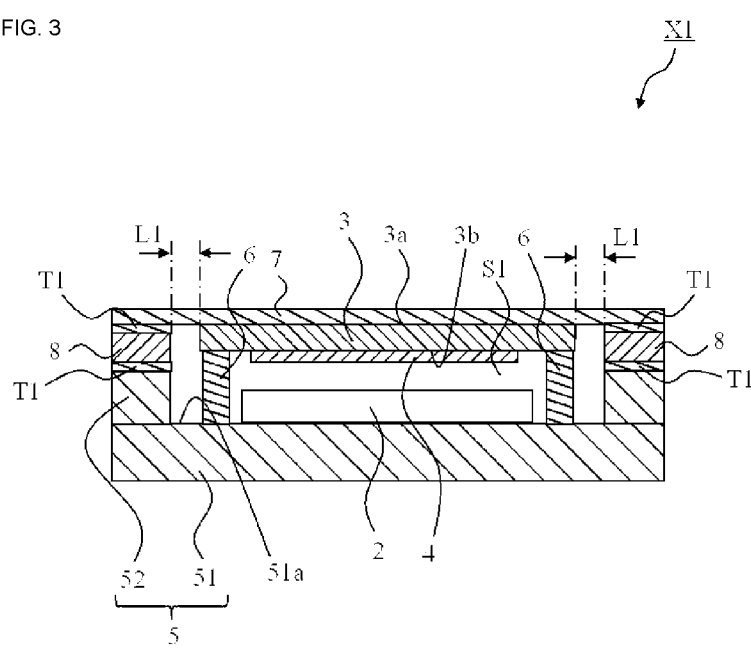
FIG. 3 is a cross-sectional view taken along a cutting-plane line I-I illustrated in FIG. 1.
Figure 4:
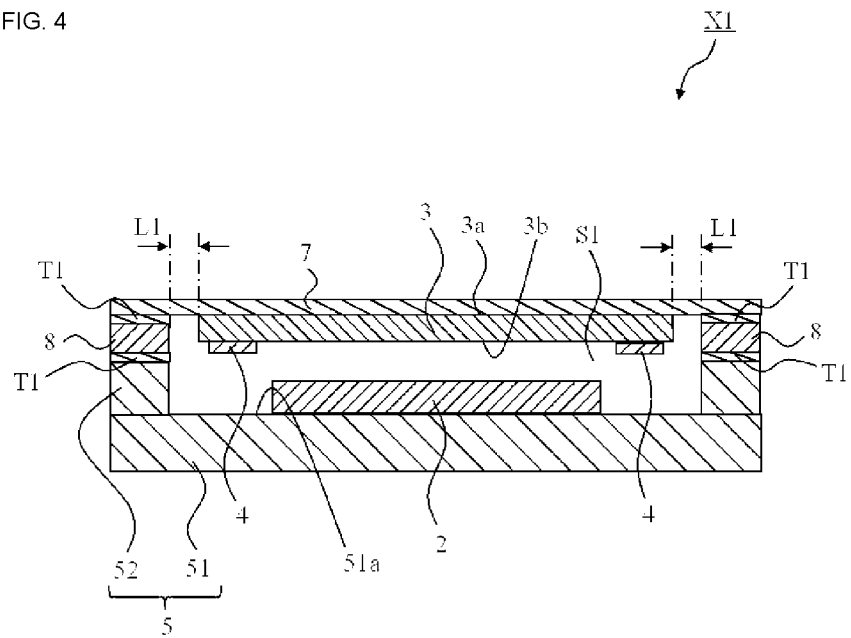
FIG. 4 is a cross-sectional view taken along a cutting-plane line II-II illustrated in FIG. 1.

The touch panel 3 has a front surface 3a and a back surface 3b, and serves as a detecting unit that detects a location where a user operates with a finger, a pen, or the like, as an input position. As illustrated in FIG. 3 and FIG. 4, the touch panel 3 is disposed opposite the liquid crystal panel 2 with a space S1 interposed therebetween. As illustrated in FIG. 1 and FIG. 2, the touch panel 3 has a rectangular shape in plan view. In this specification, even when the outer circumferences of four corners C1 to C4 of the touch panel 3 have circular shapes in plan view, the touch panel 3 is described as having a rectangular shape in plan view. That is to say, it is sufficient that the touch panel 3 has a substantially rectangular shape in plan view. In this specification, "substantially" means the same as "approximately". In the first embodiment, a capacitive touch panel is used as the touch panel 3 in terms of improvement in the detection sensitivity. However, a resistive touch panel, a surface acoustic wave touch panel, an infrared touch panel, an electromagnetic induction type touch panel, or the like may be used instead of the capacitive touch panel.

The vibrating body 4 is a member that serves to cause flexural vibration of the touch panel 3 upon detection of a predetermined input operation by a user. Specifically, the vibrating body 4 repeats expansion and contraction motions in a short-side direction of the touch panel 3 (a right and left direction in FIG. 1 when the drawing is viewed from above), thereby causing flexural vibration of the touch panel 3 in the thickness direction (hereinafter, this direction is referred to as a "vertical direction"). The vibrating body 4 also serves to detect a pressing load applied to the touch panel 3, as will be described later. The vibrating body 4 is provided on the back surface 3b of the touch panel 3 with an adhesive member not illustrated. The back surface 3b of the touch panel 3 means a lower surface of a substrate included in the touch panel 3. In the first embodiment, the vibrating body 4 is, for example, a piezoelectric element that performs expansion and contraction motions based on an applied voltage; however, it is not limited thereto. An electromagnetic vibrating body, a spring, a motor, or the like may be used instead of the piezoelectric element.

In the first embodiment, as illustrated in FIG. 1 and FIG. 2, the vibrating body 4 is formed of two vibrating bodies that are respectively provided in the vicinity of both short sides of the touch panel 3, along the short sides. However, the layout position, the number, and the like of the vibrating body 4 are not particularly limited. For example, the vibrating body 4 may be formed of two vibrating bodies that are respectively provided in the vicinity of both long sides of the touch panel 3 along the long sides, or may be formed of four vibrating bodies that are respectively provided in the vicinity of all of the long sides and the short sides of the touch panel 3 along the long sides and the short sides.

The first housing 5 includes a base 51 and a frame body 52. The base 51 has a principal surface 51a. The liquid crystal panel 2 is provided on the principal surface 51a of the base 51. The frame body 52 is provided on the principal surface 51a of the base 51 so as to surround the liquid crystal panel 2. Examples of a material of the base 51 and the frame body 52 include: resin such as polycarbonate; and metal such as stainless, aluminum, or magnesium alloy. The base 51 and the frame body 52 may be integrally formed or may be separately formed.

The supporting body 6 is a member that serves to support the touch panel 3. The supporting body 6 is provided on the principal surface 51a of the base 51. In the first embodiment, a plurality of supporting bodies 6 are located at six positions in total, i.e., at the four corners C1 to C4 of the touch panel 3, at a location between the corners C1 and C2, and at a location between the corners C3 and C4. The supporting body 6 has a cylindrical shape for example. However, the supporting body 6 may have a rectangular columnar shape. Examples of a material of the supporting body 6 include silicone rubber, urethane rubber, urethane foam, and other rubbers.

The operation unit 7 is a member that serves to allow a user to perform an input operation with a finger, a pen, or the like. The operation unit 7 is located at the front surface 3a side of the touch panel 3 so as to cover the touch panel 3, in plan view. In the first embodiment, the operation unit 7 is bonded to the front surface 3a of the touch panel 3 via OCA (Optical Clear Adhesive). The operation unit 7 has translucency. In the specifications, the translucency means visible light permeability. The operation unit 7 is formed of, for example, a film made of synthetic resin, such as polyethylene terephthalate, or formed of thin glass or thin plastic.

The flexible portion 8 has a function to be deflected according to flexural vibration of the touch panel 3. Therefore, the flexible portion 8 has elasticity. Examples of a material of the flexible portion 8 include urethane rubber, urethane resin, urethane foam, silicone rubber, and polyester.

The flexible portion 8 supports the operation unit 7. As illustrated in FIG. 2, the flexible portion 8 is provided over the whole circumference of the frame body 52. Specifically, the flexible portion 8 is located between the operation unit 7 and the frame body 52, and is bonded to the operation unit 7 and the frame body 52 with a double-stick tape T1. The space S1 is sealed with the base 51, the frame body 52, the operation unit 7, and the flexible portion 8. Therefore, the electronic equipment X1 can ensure certain dustproofing and waterproofing for the liquid crystal panel 2. To ensure more waterproof performance, it is preferable to use a waterproof double-stick tape as the double-stick tape T1.

Figure 5:
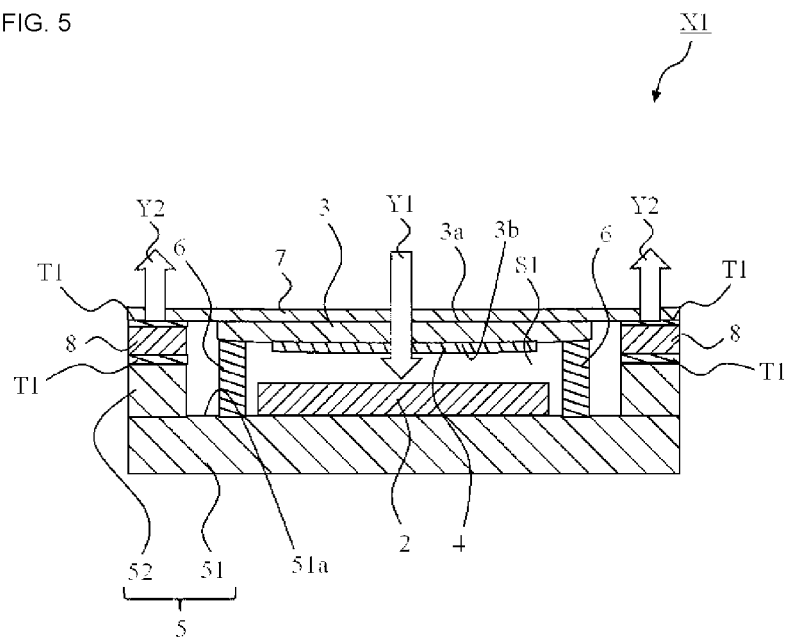
FIG. 5 is a diagram illustrating a state in which a touch panel and the operation unit are curved downward and a flexible portion is deflected upward.
Figure 6:
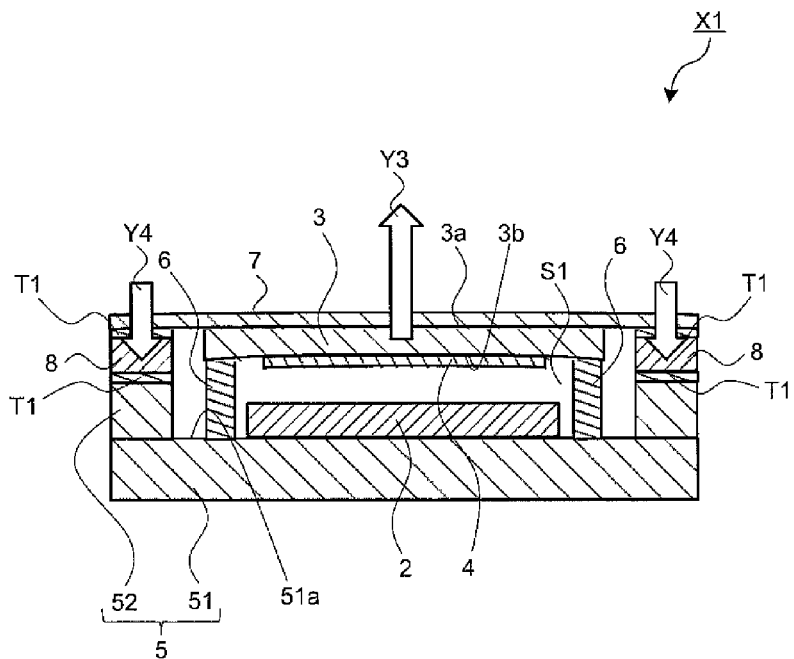
FIG. 6 is a diagram illustrating a state in which the touch panel and the operation unit are curved upward and the flexible portion is deflected downward.

Motions of the flexible portion 8 will be explained below. When the vibrating body 4 contracts upon application of a voltage to the vibrating body 4, the touch panel 3 is curved downward with the supporting bodies 6 serving as supporting points, as indicated by an arrow Y1 in FIG. 5. Along with the downward curvature of the touch panel 3, the operation unit 7 is also curved downward. Along with the downward curvature of the operation unit 7, the flexible portion 8 is deflected upward as indicated by an arrow Y2 in FIG. 5. On the other hand, when the contraction of the vibrating body 4 is released and the vibrating body 4 expands in the short-side direction of the touch panel 3, the touch panel 3 is curved upward at the supporting bodys 6 serving as supporting points, as indicated by an arrow Y3 in FIG. 6. Along with the upward curvature of the touch panel 3, the operation unit 7 is also curved upward. Along with the upward curvature of the operation unit 7, the flexible portion 8 is deflected downward as indicated by an arrow Y4 in FIG. 6.

In this way, flexure vibration of the touch panel 3 and the operation unit 7 with the supporting bodies 6 serving as supporting points occurs in the vertical direction. Along with the flexure vibration, the flexible portion 8 is deflected in the vertical direction. By providing the flexible portion 8 in the electronic equipment X1, it is possible to reduce the possibility that the flexure vibration of the touch panel 3 and the operation unit 7 may be suppressed. Therefore, the electronic equipment X1 can adequately transmit tactile senses to a user.

As illustrated in FIG. 3 and FIG. 4, it is preferable to provide a gap L1 between the touch panel 3 and the flexible portion 8. Specifically, the gap L1 is a portion of the operation unit 7 that is not supported by the touch panel 3 and the flexible portion 8. If the gap L1 is provided, it becomes possible to cause adequate flexural vibration of the operation unit 7 in the vertical direction in accordance with the flexural vibration of the touch panel 3 in the vertical direction. It is preferable to set the gap L1 to a range approximately from 0.1 mm to 10 mm although it depends on the thickness of the operation unit 7.

Operations of the electronic equipment X1 will be explained below with reference to FIG. 7.

In the following, an operation example of the electronic equipment X1 will be explained in which a sense of pressing is transmitted to a user as tactile transmission. However, the electronic equipment X1 is applicable to a case where various tactile senses, such as a sense of tracing or a sense of texture, in addition to the sense of pressing are transmitted.

Figure 7:
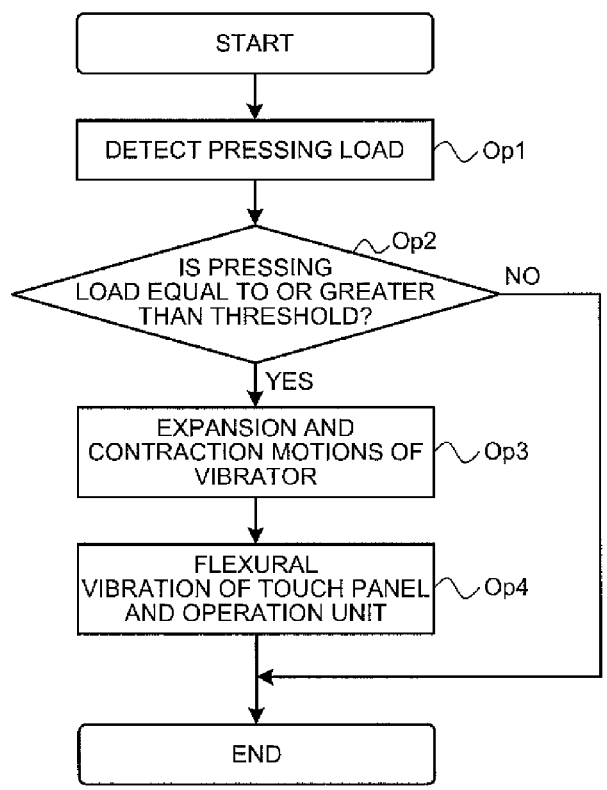
FIG. 7 is a flowchart illustrating an operation example of the electronic equipment.

As illustrated in FIG. 7, when a user presses the touch panel 3 via the operation unit 7, the vibrating body 4 detects a pressing load on the touch panel 3 (Op1). A load detection function of the vibrating body 4 will be explained below. Specifically, when a user presses the touch panel 3 via the operation unit 7, the touch panel 3 is curved downward. When the touch panel 3 is curved downward, the vibrating body 4 is also curved downward. In other words, the amount of curvature of the vibrating body 4 varies depending on a pressing load on the touch panel 3. In the first embodiment, because the vibrating body 4 is a piezoelectric element, the vibrating body 4 can perform conversion to a voltage according to the amount of curvature. Therefore, the vibrating body 4 can detect the pressing load on the touch panel 3. An example has been explained above in which the load detection function is implemented by the vibrating body 4; however, the present invention is not limited thereto. For example, a load sensor, such as a distortion sensor, may be used to implement the load detection function.

When the pressing operation that the user has performed on the touch panel 3 is a pressing operation on an input object displayed on a display screen, a tactile transmission driver not illustrated determines whether the pressing load detected in Op1 is equal to or greater than a threshold (Op2). Here, the tactile transmission driver is provided on, for example, an FPC (Flexible Printed Circuit) connected to the touch panel 3, together with a touch panel driver that controls the touch panel 3.

If it is determined that the pressing load detected in Op1 is equal to or greater than the threshold (YES in Op2), the tactile transmission driver causes the vibrating body 4 to make expansion and contraction motions in the short-side direction of the touch panel 3 (Op3). The vibrating body 4 that has been caused to make expansion and contraction motions in Op3 causes flexural vibration of the touch panel 3 and the operation unit 7 in the vertical direction (Op4). Therefore, a sense of pressing is transmitted to the user who has pressed the touch panel 3 via the operation unit 7. On the other hand, if it is determined that the pressing load detected in Op1 is smaller than the threshold (NO in Op2), the tactile transmission driver ends the processing illustrated in FIG. 7.

As described above, the electronic equipment X1 can adequately transmit tactile senses to a user while ensuring certain dustproof performance and waterproof performance.

Second Embodiment

Figure 8:
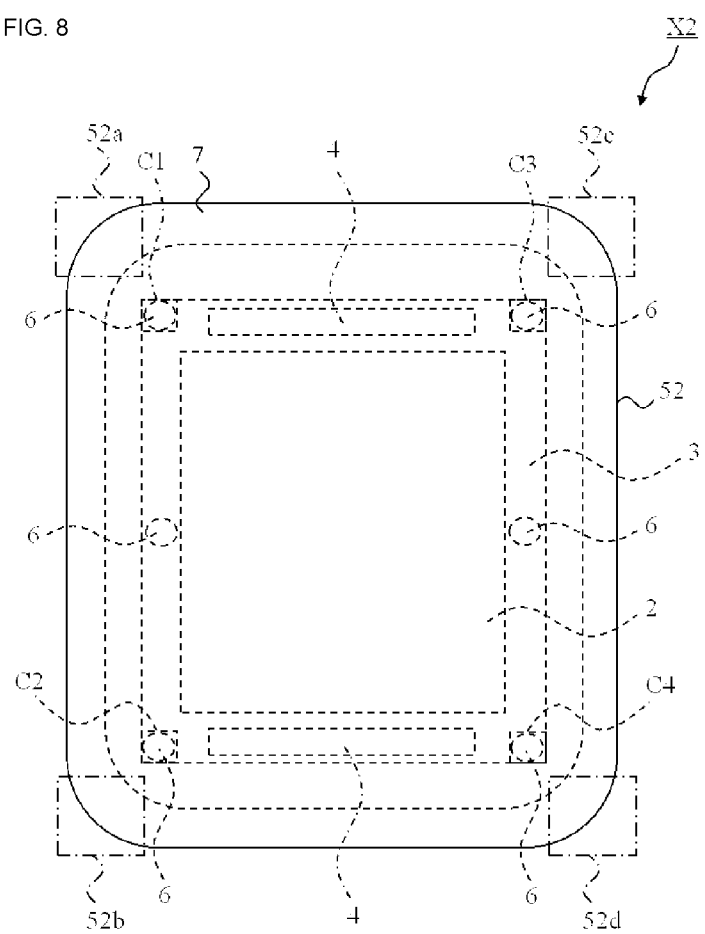
FIG. 8 is a plan view illustrating an overall configuration of an electronic equipment according to a second embodiment of the present invention.
Figure 9:
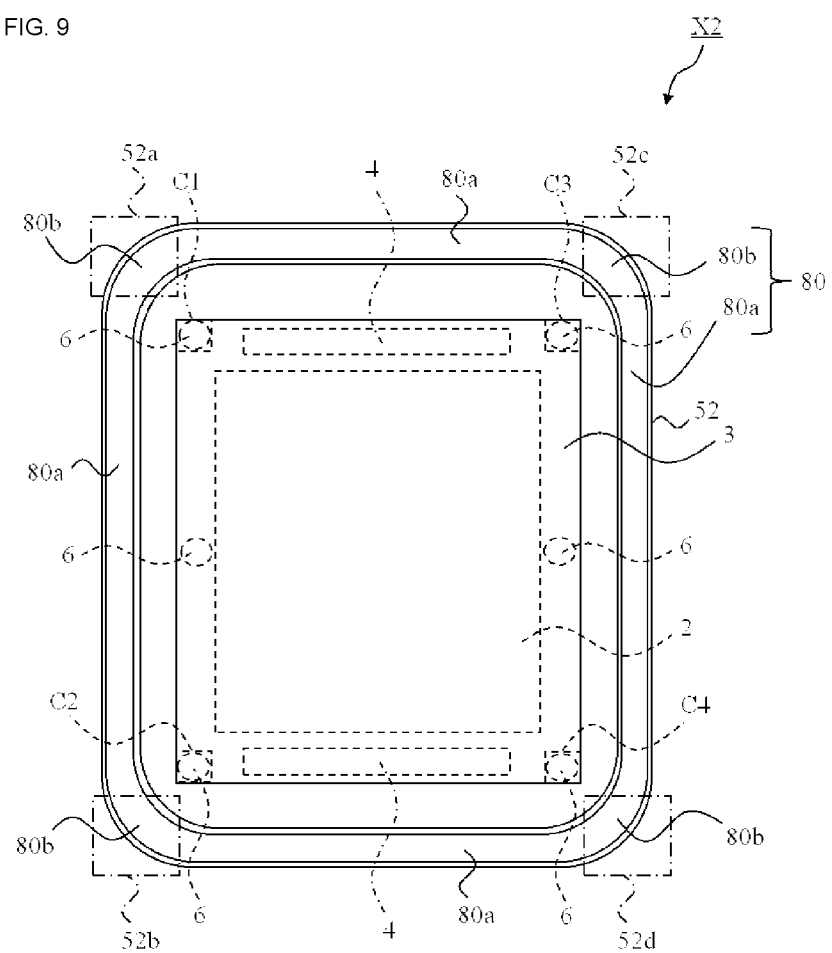
FIG. 9 is a plan view illustrating an overall configuration of the electronic equipment illustrated in FIG. 8, when the electronic equipment is viewed from above while the operation unit is omitted.

FIG. 8 is a plan view illustrating an overall configuration of an electronic equipment X2 according to a second embodiment. FIG. 9 is a plan view illustrating an overall configuration of the electronic equipment X2 illustrated in FIG. 8, when the electronic equipment X2 is viewed from above while the operation unit 7 is omitted. In FIG. 8 and FIG. 9, components having the same functions as those illustrated in FIG. 1 and FIG. 2 are denoted by the same reference numerals, and the detailed explanation thereof will be omitted.

In the electronic equipment X2, the frame body 52 has four corners 52a to 52d. The electronic equipment X2 includes a flexible portion 80 instead of the flexible portion 8 explained in the first embodiment. The flexible portion 80 includes a first part 80a and second parts 80b. The second parts 80b are respectively located at the four corners 52a to 52d of the frame body 52 and the degree of flexure thereof is lower than the degree of flexure of the first part 80a. In the second embodiment, the degree of flexure of the first part 80a is set between 10% and 90%, the degree of flexure of the second parts 80b is set between 0% and 70%, and the degree of flexure of the second parts 80b is set to be lower than the first part 80a. In other words, the second parts 80b are harder than the first part 80a. The "flexure" means deformation of a material. The "degree of flexure" means a rate of deformation of the material.

The first part 80a is located on the outer circumferential portion of the frame body 52 except for the four corners 52a to 52d. The second parts 80b are respectively located at the four corners 52a to 52d of the frame body 52. The second parts 80b are made of a material different from a material of the first part 80a so that the degree of flexure of the second parts 80b becomes lower than the degree of flexure of the first part 80a. For example, the first part 80a is made of silicon rubber, urethane rubber, urethane resin, or polyester, and the second parts 80b are made of silicon rubber, urethane rubber, or polyester.

It may be possible to form the first part 80a and the second parts 80b in different shapes so that the degree of flexure of the second parts 80b can become lower than the degree of flexure of the first part 80a. For example, the first part 80a may be formed in an M-shape in sectional view and the second parts 80b may be formed in rectangular shapes in sectional view. If the first part 80a is formed in an M-shape in sectional view, the first part 80a expands and contracts in accordance with the flexure vibration of the touch panel 3 and the operation unit 7, and the expanding and contracting force enables a biasing force to be applied for the flexure vibration of the touch panel 3 and the operation unit 7, which is preferable. This is because when the first part 80a is contracted, because the first part 80a is formed in the M-shape, a repulsive force against the contraction becomes greater compared with other shapes. The first part 80a may be formed in a bracket shape in sectional view or in a shape with a hollow.

As described above, according to the second embodiment, the first part 80a is located on the outer circumferential portion of the frame body 52 except for the four corners 52a to 52d, and the second parts 80b whose degree of flexure is lower than the degree of flexure of the first part 80a are respectively located at the four corners 52a to 52d of the frame body 52. Therefore, when causing the flexural vibration of the touch panel 3 and the operation unit 7 in the vertical direction by expansion and contraction motions of the vibrating body 4, it is possible to cause adequate flexural vibration of the operation unit 7 in the vertical direction at the second parts 80b, as supporting points, located at the four corners 52a to 52d of the frame body 52. Therefore, the electronic equipment X2 can more adequately transmit tactile senses to a user compared with the electronic equipment X1.

As described above, the electronic equipment X2 can adequately transmit tactile senses to a user while ensuring certain dustproof performance and waterproof performance.

In the second embodiment, because the flexible portion 80 includes the first part 80a and the second parts 80b, which are respectively located at the four corners 52a to 52d of the frame body 52 and the degree of flexure of which is lower than the degree of flexure of the first part 80a, the supporting bodys 6 do not necessarily have to be provided.

Furthermore, in the second embodiment, an example has been explained in which the second parts 80b are respectively located at the four corners 52a to 52d of the frame body 52; however the present invention is not limited thereto. The second parts 80b may be provided between the corners 52a and 52b and between the corners 52c and 52d, in addition to the positions of the four corners 52a to 52d of the frame body.

Third Embodiment

Figure 10:
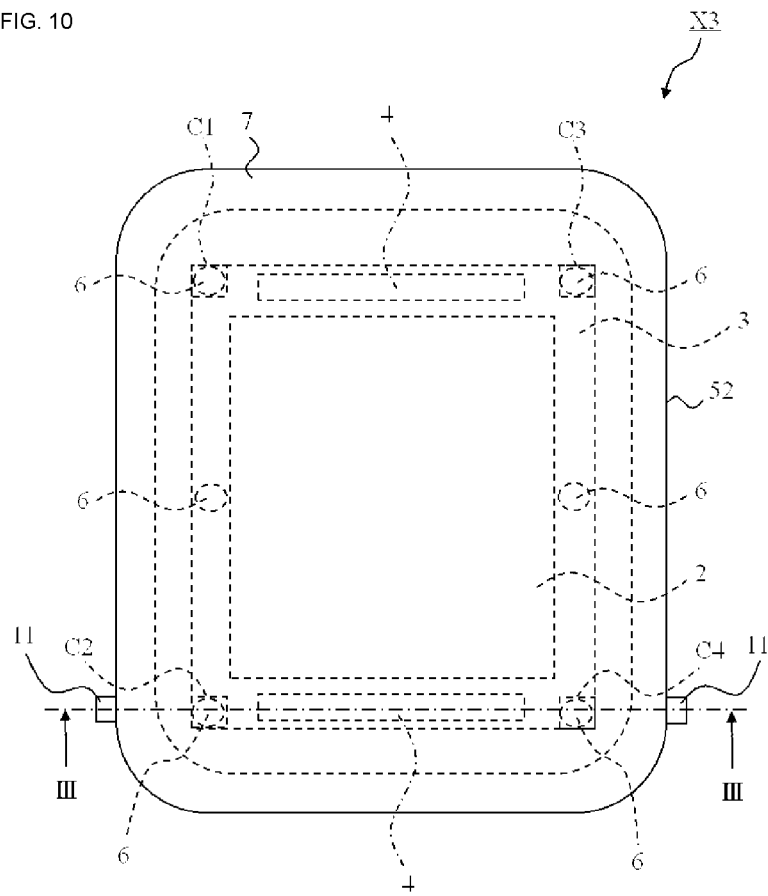
FIG. 10 is a plan view illustrating an overall configuration of an electronic equipment according to a third embodiment of the present invention.
Figure 11:
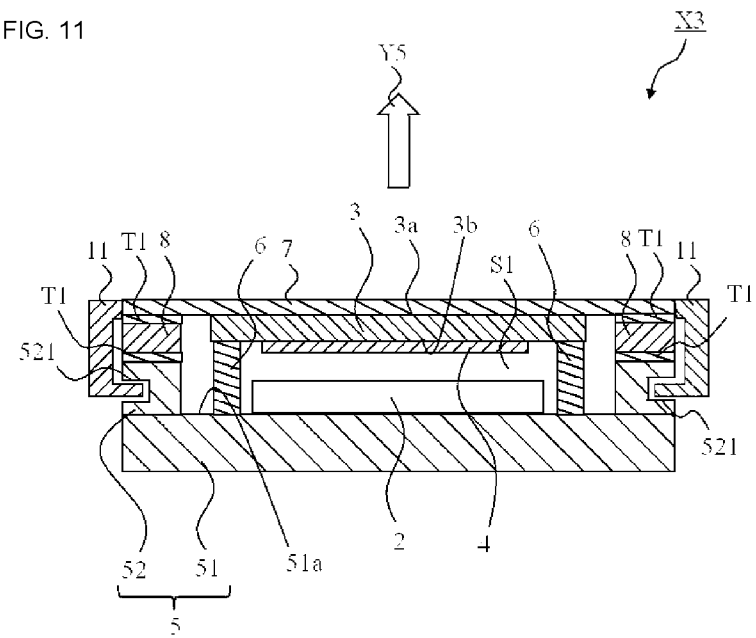
FIG. 11 is a cross-sectional view taken along a cutting-plane line III-III illustrated in FIG. 10.

FIG. 10 is a plan view illustrating an overall configuration of an electronic equipment X3 according to a third embodiment. FIG. 11 is a cross-sectional view taken along a cutting-plane line III-III illustrated in FIG. 10. In FIG. 10 and FIG. 11, components having the same functions as those illustrated in FIG. 1 and FIG. 3 are denoted by the same reference numerals, and the detailed explanation thereof will be omitted.

In the electronic equipment X3, the frame body 52 includes a groove 521. The electronic equipment X3 also includes a stopper 11 that prevents the operation unit 7 from being detached from the frame body 52. The stopper 11 is inserted into the groove 521 of the frame body 52. Examples of a material of the stopper 11 include the same material as the first housing 5. A case will be explained below that an external force is applied to the electronic equipment X3 when, for example, the electronic equipment X3 drops down. In this case, the double-stick tape T1 provided between the operation unit 7 and the flexible portion 8 or the double-stick tape T1 provided between the flexible portion 8 and the frame body 52 may be removed. If the double-stick tape T1 is removed, the operation unit 7 may be detached from the frame body 52. However, in the third embodiment, even when a force is applied in a direction indicated by an arrow Y5 in FIG. 11, the stopper 11 comes in contact with the inner wall surface of the groove 521 of the frame body 52. Because the stopper 11 comes in contact with the inner wall surface of the groove 521 of the frame body 52, the electronic equipment X3 can prevent the operation unit 7 from being detached from the frame body 52.

As described above, the electronic equipment X3 can adequately transmit tactile senses to a user while ensuring certain dustproof performance and waterproof performance. Furthermore, the electronic equipment X3 can improve the reliability.

Fourth Embodiment

Figure 12:
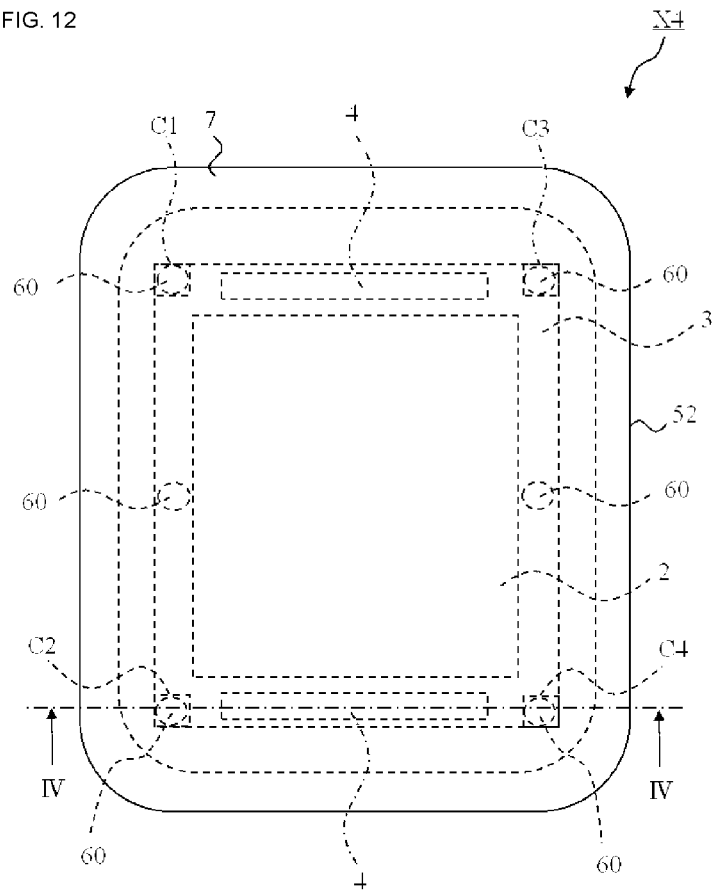
FIG. 12 is a plan view illustrating an overall configuration of an electronic equipment according to a fourth embodiment of the present invention.
Figure 13:
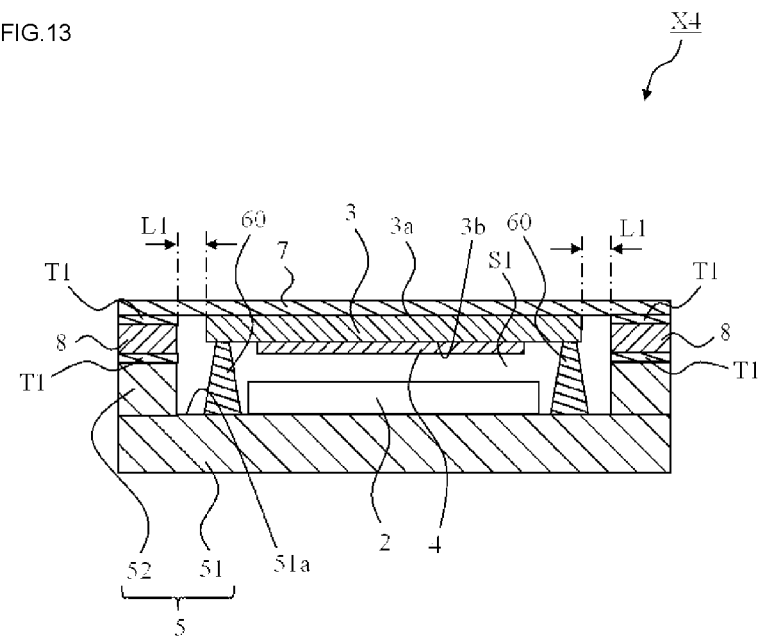
FIG. 13 is a cross-sectional view taken along a cutting-plane line IV-IV illustrated in FIG. 12.

FIG. 12 is a plan view illustrating an overall configuration of an electronic equipment X4 according to a fourth embodiment. FIG. 13 is a cross-sectional view taken along a cutting-plane line IV-IV illustrated in FIG. 12. FIG. 14 is an enlarged view of a supporting body 60. In FIG. 12 and FIG. 13, components having the same functions as those illustrated in FIG. 1 and FIG. 3 are denoted by the same reference numerals, and the detailed explanation thereof will be omitted.

The electronic equipment X4 includes the supporting body 60 instead of the supporting body 6 explained in the first embodiment. In the fourth embodiment, the supporting body 60 is configured such that a diameter M1 of a surface 60a of the supporting body 60 that comes in contact with the back surface 3b of the touch panel 3 is smaller than a diameter M2 of a surface 60b of the supporting body 60 that comes in contact with the principal surface 51a of the base 51. Specifically, the supporting body 60 has a so-called tapered shape such that the diameter thereof gradually increases from the back surface 3b side of the touch panel 3 toward the principal surface 51a of the base 51. By configuring the supporting body 60 as described above, it is possible to reduce the degree of restraint to the touch panel 3 caused by the supporting body 60. Therefore, the electronic equipment X4 can adequately transmit tactile senses to a user.

As described above, the electronic equipment X4 can adequately transmit tactile senses to a user while ensuring certain dustproof performance and waterproof performance.

Fifth Embodiment

Figure 16:
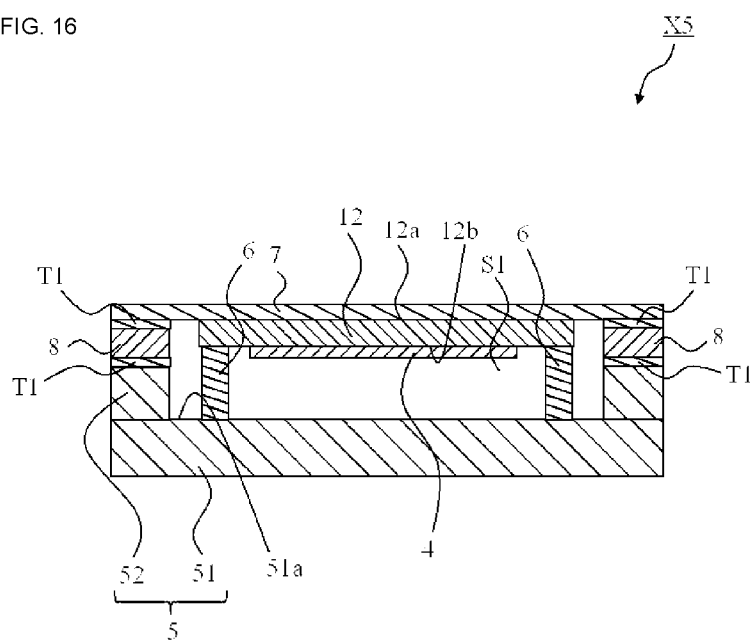
FIG. 16 is a cross-sectional view taken along a cutting-plane line V-V illustrated in FIG. 15.

FIG. 15 is a plan view illustrating an overall configuration of an electronic equipment X5 according to a fifth embodiment. FIG. 16 is a cross-sectional view taken along a cutting-plane line V-V illustrated in FIG. 15. In FIG. 15 and FIG. 16, components having the same functions as those illustrated in FIG. 1 and FIG. 3 are denoted by the same reference numerals, and the detailed explanation thereof will be omitted.

The electronic equipment X5 includes a liquid crystal panel 12 having a function to detect an input position, instead of the liquid crystal panel 2 and the touch panel 3 explained in the first to the third embodiments. Specifically, the liquid crystal panel 12 is supported by the supporting body 6. The operation unit 7 is provided on a front surface 12a of the liquid crystal panel 12. The vibrating body 4 is provided on a back surface 12b of the liquid crystal panel 12.

The liquid crystal panel 12 includes one substrate; other substrate disposed opposite the one substrate; a liquid crystal layer interposed between the one substrate and the other substrate; a photodetector provided on the one substrate; a display member layer that is interposed between the one substrate and the other substrate and that contributes to displaying; and a backlight that irradiates the one substrate and the other substrate with light.

The function of the liquid crystal panel 12 to detect an input position will be explained below. Specifically, when a finger is placed on the liquid crystal panel 12 via the operation unit 7 while external light is incident on the photodetector, external light that is incident on a portion of the photodetector corresponding to the finger is blocked. Therefore, the liquid crystal panel 12 can detect an input position by comparing a detection level of the photodetector on which external light is incident with a detection level of the photodetector on which external light is not incident.

An example has been explained above in which the liquid crystal panel 12 including a photodetector is employed as a liquid crystal panel that has a function to detect an input position; however, the present invention is not limited thereto. For example, it may be possible to employ a liquid crystal panel, in which a detection electrode of a capacitive touch panel is formed on a substrate on the liquid crystal panel side.

As described above, the electronic equipment X5 can adequately transmit tactile senses to a user while ensuring certain dustproof performance and waterproof performance. Furthermore, because the electronic equipment X5 includes the liquid crystal panel 12 having a function to detect an input position, it is not necessary to separately provide a touch panel, enabling to reduce the size of the electronic equipment X5.

Sixth Embodiment

Figure 17:
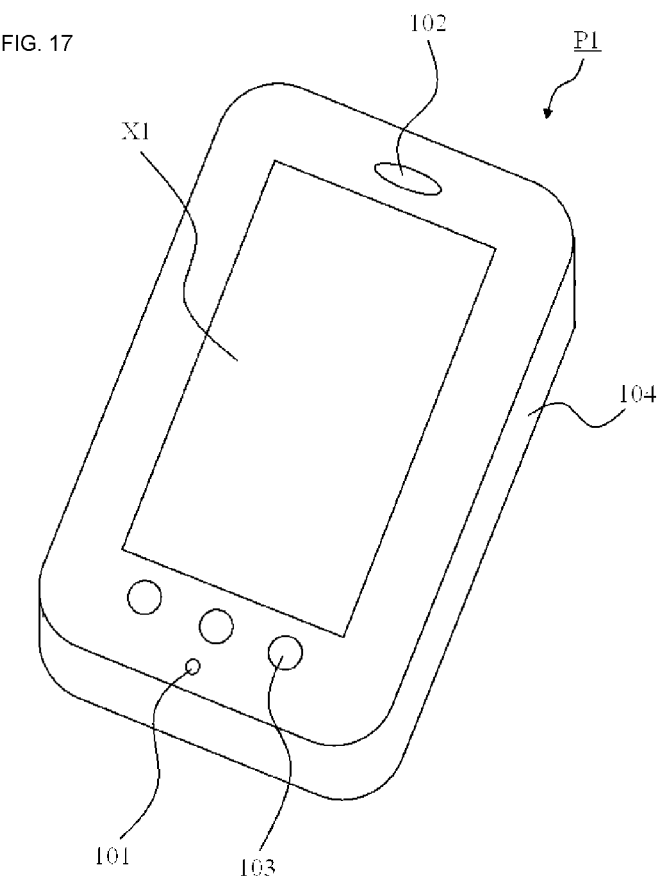
FIG. 17—is a perspective view illustrating an overall configuration of a mobile terminal.

FIG. 17 is a perspective view illustrating an overall configuration of a mobile terminal P1 according to a sixth embodiment. As illustrated in FIG. 17, the mobile terminal P1 is, for example, a terminal, such as a mobile phone, a smartphone, or a PDA, and includes the electronic equipment X1 explained in the first embodiment, a voice input unit 101, a voice output unit 102, a key input unit 103, and a second housing 104.

The voice input unit 101 is formed of, for example, a microphone, and receives voice of a user or the like. The voice output unit 102 is formed of a speaker or the like, and outputs voice of a counterpart or the like. The key input unit 103 is formed of, for example, a mechanical key. The key input unit 103 may be an operation key displayed on a display screen. The second housing 104 is a member that serves to house the electronic equipment X1, the voice input unit 101, the voice output unit 102, and the key input unit 103.

In addition, the mobile terminal P1 may include a digital camera function unit, a tuner for one-segment broadcasting, a short-distance wireless communication unit, such as an infrared communication function unit, and various interfaces, depending on a required function. However, detailed illustration and explanation of the units are omitted.

The mobile terminal P1 includes the electronic equipment X1; therefore, it is possible to adequately transmit tactile senses to a user while ensuring certain dustproof performance and waterproof performance.

An example has been explained above in which the mobile terminal P1 includes the voice input unit 101; however, the present invention is not limited thereto. Specifically, the mobile terminal P1 does not necessarily have to include the voice input unit 101.

Furthermore, while an example has been explained above in which the mobile terminal P1 includes the electronic equipment X1, any of the electronic equipments X2 to X5 may be employed instead of the electronic equipment X1. Moreover, it may be possible to employ a mobile terminal that includes any of the electronic equipments X2 to X5. The above embodiments may be combined as needed.

An example has been explained above in which the electronic equipments X1 to X5 are applied to the tactile transmission technique; however, the present invention is not limited thereto. The electronic equipment X1 to X5 may be applied to, for example, a technique for a panel speaker that outputs voice or a technique that enables listening to voice by bone conduction, in addition to the tactile transmission technique.

REFERENCE SIGNS LIST

X1 to X5 ELECTRONIC EQUIPMENT
P1 MOBILE TERMINAL
2 LIQUID CRYSTAL PANEL (DISPLAY PANEL)
3 TOUCH PANEL (DETECTING UNIT)
4 VIBRATING BODY
5 FIRST HOUSING
51 BASE
52 FRAME BODY
52a to 52d CORNERS OF FRAME BODY
6 60 SUPPORTING BODY
7 OPERATION UNIT
8 80 FLEXIBLE PORTION
80a FIRST PART
80b SECOND PART
11 STOPPER
12 LIQUID CRYSTAL PANEL (DETECTING UNIT, DISPLAY PANEL)
104 SECOND HOUSING

The invention claimed is:

1. An electronic equipment comprising:
a detecting unit that detects an input position;
a vibrating body provided on the detecting unit;
a first housing including a base disposed opposite the detecting unit with a space interposed therebetween and a frame body positioned on the base so as to surround the detecting unit in plan view;
an operation unit positioned at a front surface side of the detecting unit so as to cover the detecting unit in plan view, the operation unit having an approximately rectangular shape in plan view; and
a flexible portion provided over a whole circumference of the frame body and supporting the operation unit, wherein
the flexible portion includes:
a first part; and
second parts respectively positioned at four corners of the frame body and each having a degree of flexure lower than a degree of flexure of the first part, and
the first part is located on an outer circumferential portion of the frame body except for the four corners.

2. The electronic equipment according to claim 1, wherein
the detecting unit has an approximately rectangular shape in plan view; and
the electronic equipment further comprises a supporting body provided on the base and supporting four corners of the detecting unit.

3. The electronic equipment according to claim 2, wherein a diameter of a surface of the supporting body in contact with the detecting unit is smaller than a diameter of a surface of the supporting body in contact with the base.

4. The electronic equipment according to claim 1, wherein a gap is provided between the detecting unit and the flexible portion.

5. The electronic equipment according to claim 1, further comprising a stopper that prevents the operation unit from being detached from the frame body.

6. The electronic equipment according to claim 1, wherein
the detecting unit is a touch panel, and
the electronic equipment further comprises a display panel provided between the detecting unit and the base.

7. The electronic equipment according to claim 6, wherein the display panel is a liquid crystal panel or an organic EL panel.

8. The electronic equipment according to claim 1, wherein the detecting unit is a display panel having a function to detect an input position.

9. The electronic equipment according to claim 8, wherein the display panel is a liquid crystal panel or an organic EL panel.

10. A mobile terminal comprising the electronic equipment according to claim 1 in a second housing.

* * * * *